US007676764B2

(12) United States Patent
Nakajima

(10) Patent No.: US 7,676,764 B2
(45) Date of Patent: Mar. 9, 2010

(54) DOCUMENT MANAGEMENT SYSTEM AND CONTROL METHOD THEREFOR

(75) Inventor: Satoru Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 11/290,540

(22) Filed: Dec. 1, 2005

(65) Prior Publication Data

US 2006/0119890 A1 Jun. 8, 2006

(30) Foreign Application Priority Data

Dec. 2, 2004 (JP) ............................. 2004-350307
Nov. 11, 2005 (JP) ............................. 2005-328086

(51) Int. Cl.
*G06F 3/048* (2006.01)
*G06F 17/00* (2006.01)
*G06F 3/00* (2006.01)

(52) U.S. Cl. ..................... 715/846; 715/272; 715/274; 715/277; 715/853; 715/859

(58) Field of Classification Search ............... 715/846, 715/272, 274, 277, 853, 859, 862
See application file for complete search history.

(56) References Cited

U.S. PATENT DOCUMENTS

| | | | | |
|---|---|---|---|---|
| 5,436,730 A * | 7/1995 | Hube | ........................... | 358/401 |
| 5,513,126 A * | 4/1996 | Harkins et al. | ............... | 709/228 |
| 5,657,461 A * | 8/1997 | Harkins et al. | ............... | 715/733 |
| 5,689,642 A * | 11/1997 | Harkins et al. | ............... | 709/207 |
| 5,727,135 A * | 3/1998 | Webb et al. | ................. | 358/1.14 |
| 5,978,559 A * | 11/1999 | Quinion | ...................... | 358/1.15 |
| 6,130,757 A * | 10/2000 | Yoshida et al. | ............. | 358/1.15 |
| 6,348,971 B2 * | 2/2002 | Owa et al. | .................. | 358/1.15 |
| 6,615,372 B1 * | 9/2003 | Wang | ........................... | 714/46 |
| 6,642,943 B1 * | 11/2003 | Machida | ..................... | 715/763 |

(Continued)

FOREIGN PATENT DOCUMENTS

JP  8-202607  8/1996

(Continued)

*Primary Examiner*—Steven P Sax
*Assistant Examiner*—Linh K Pham
(74) *Attorney, Agent, or Firm*—Fitzpatrick, Cella, Harper & Scinto

(57) ABSTRACT

There is provided a document management system capable of displaying indexes indicating input/output devices connected on a network in a manner that an operator can clearly distinguish between devices which are capable of correctly performing processing in accordance with the setting made for an inputted job and devices which are not capable thereof, and a control method therefor. An icon for each processing function which each of several devices connected to a network has is displayed on a screen, several pieces of information being managed in the document management system are listed, and a user-desired piece of information is selected among the listed plurality of pieces of information based on the user's selection operation. The setting contents set for the selected information are acquired, it is determined whether or not each processing function of the displayed several devices can process the selected information according to the acquired setting contents, the display form of the displayed icon is changed based on the determination result so that it is possible to distinguish between the processing function of a device which can process the selected information according to the acquired setting contents and the processing function of a device which cannot do so.

13 Claims, 14 Drawing Sheets

U.S. PATENT DOCUMENTS

| | | | |
|---|---|---|---|
| 6,714,974 B1 * | 3/2004 | Machida | 709/223 |
| 6,744,527 B1 * | 6/2004 | Dorsey et al. | 358/1.12 |
| 6,779,934 B2 * | 8/2004 | Laughlin | 400/63 |
| 6,886,036 B1 * | 4/2005 | Santamaki et al. | 709/223 |
| 6,917,437 B1 * | 7/2005 | Myers et al. | 358/1.15 |
| 6,956,663 B1 * | 10/2005 | Iida | 358/1.15 |
| 6,978,422 B1 * | 12/2005 | Bushe et al. | 715/734 |
| 7,019,861 B2 * | 3/2006 | Aagesen | 358/1.15 |
| 7,165,714 B2 * | 1/2007 | Robertson | 235/375 |
| 7,171,442 B1 * | 1/2007 | Huang | 709/203 |
| 7,242,498 B2 * | 7/2007 | Fujiwara | 358/1.16 |
| 7,263,661 B2 * | 8/2007 | Chavers et al. | 715/744 |
| 2001/0043357 A1 * | 11/2001 | Owa et al. | 358/1.15 |
| 2001/0054106 A1 * | 12/2001 | Anderson et al. | 709/227 |
| 2002/0041386 A1 * | 4/2002 | Suzuki et al. | 358/1.13 |
| 2002/0186384 A1 * | 12/2002 | Winston et al. | 358/1.5 |
| 2003/0081973 A1 * | 5/2003 | Laughlin | 400/61 |
| 2003/0086114 A1 * | 5/2003 | Cherry et al. | 358/1.15 |
| 2003/0164977 A1 * | 9/2003 | Aagesen | 358/1.15 |
| 2004/0051743 A1 * | 3/2004 | Gonsho | 345/847 |
| 2004/0099723 A1 * | 5/2004 | Robertson | 235/375 |
| 2004/0122971 A1 * | 6/2004 | Joshi et al. | 709/236 |
| 2004/0153530 A1 * | 8/2004 | Machida | 709/220 |
| 2004/0203358 A1 * | 10/2004 | Anderson et al. | 455/41.1 |
| 2004/0205621 A1 * | 10/2004 | Johnson et al. | 715/523 |
| 2004/0212823 A1 * | 10/2004 | Chavers et al. | 358/1.15 |
| 2004/0216058 A1 * | 10/2004 | Chavers et al. | 715/810 |
| 2005/0024671 A1 * | 2/2005 | Abe | 358/1.13 |
| 2005/0086282 A1 * | 4/2005 | Anderson et al. | 709/200 |
| 2005/0151997 A1 * | 7/2005 | Murakami et al. | 358/1.16 |
| 2007/0083508 A1 * | 4/2007 | Nakajima | 707/5 |

FOREIGN PATENT DOCUMENTS

JP  408202607 A * 8/1996

* cited by examiner

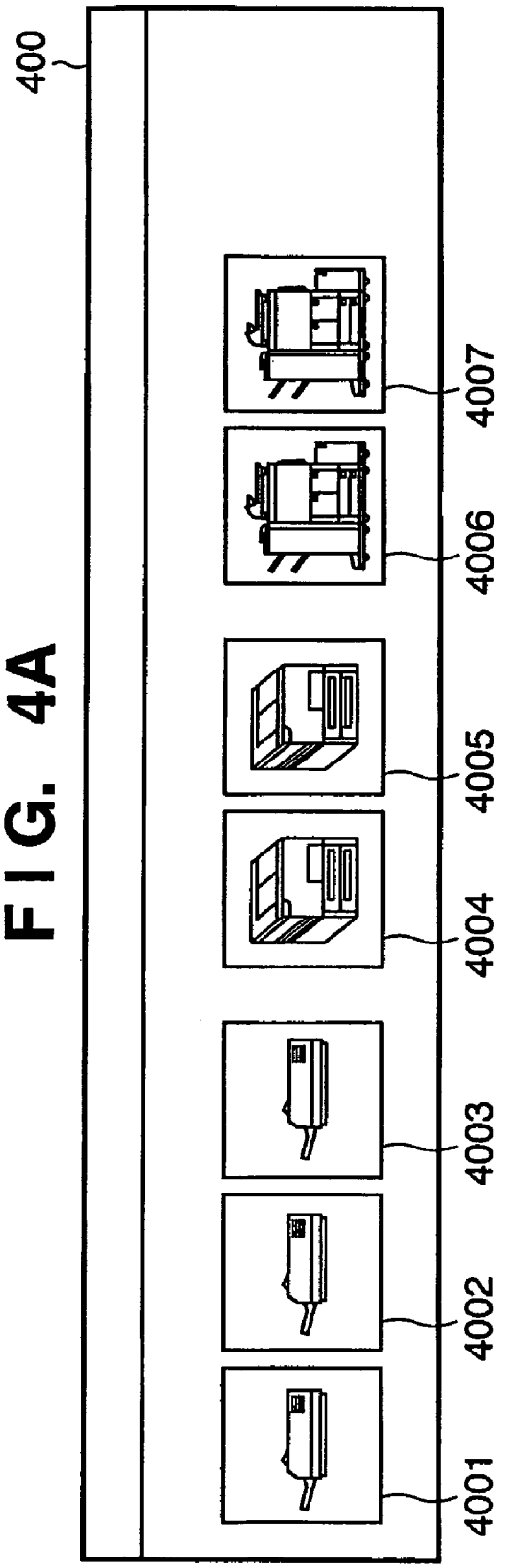
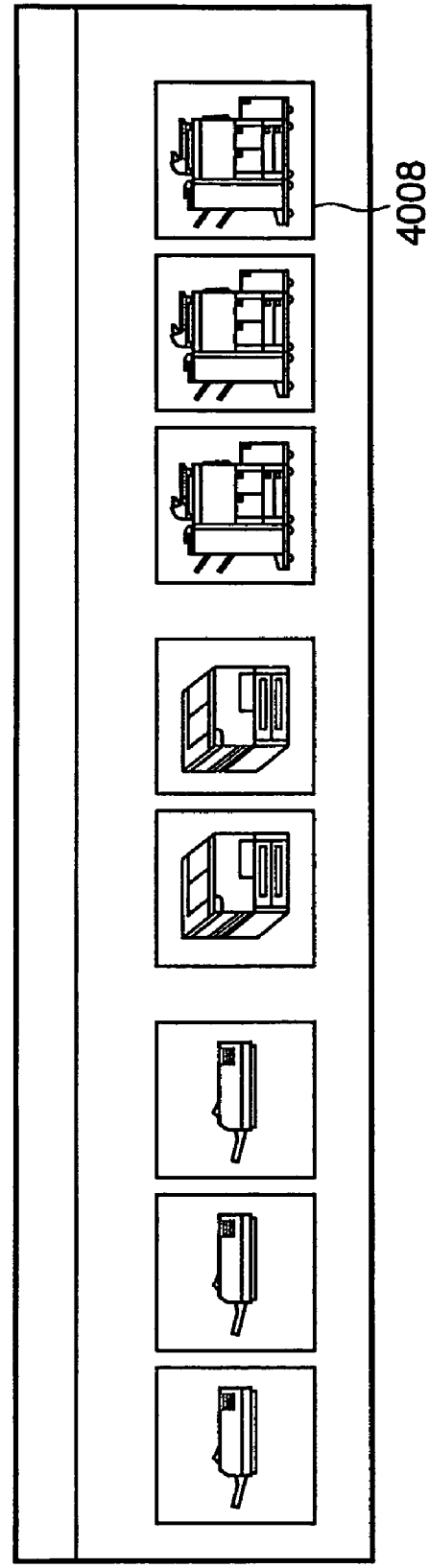

DOCUMENT MANAGEMENT SYSTEM AND CONTROL METHOD THEREFOR

FIELD OF THE INVENTION

The present invention relates to a document management system capable of connecting to multiple document input/output apparatuses connected to a network and printing a document by means of a selected document input/output apparatus.

BACKGROUND OF THE INVENTION

A document management system has been known which displays multiple input/output devices (document input/output apparatuses), such as a scanner and a printer, which can be connected on a network in a window of the document management system as indexes such as icons. In the document management system, it is possible to perform input/output processing of a document registered with a database of the system by clicking a displayed icon. As a prior art technique of this invention, there is a technique disclosed in Japanese Patent Laid-Open No. 8-202607, for example.

In the prior-art document management system as described above, however, determination can be made only about whether or not the multiple document input/output apparatuses are connected on the network or whether or not they can send/receive data. That is, in the prior-art document system, even in the case of printing a print job document which has been registered with a database and for which some print settings have been made, it is not possible to determine whether or not a device can print the print job document in accordance with the print settings held by the print job document. Therefore, there is a problem that an operator is required to do troublesome works of confirming the print settings held by the print job document first, and then confirming, for each device, whether the device is capable of performing printing in accordance with the print settings.

SUMMARY OF THE INVENTION

The present invention has been made in consideration of the above situation, and its object is capable of displaying icons according to functions input/output devices connected on a network, for example, in a manner that an operator can clearly distinguish between devices which are capable of processing documents to be processed in the setting contents (print setting) and devices which are not capable thereof.

In order to solve the above problem, for example, a document management system according to the present invention is a document management system which displays on a screen an icon corresponding to processing functions which several devices connected to a network have and selects and processes a user-desired piece of information among several pieces of information being managed, including:

icon display means for displaying icons for each processing function which each of the several devices has on the screen;

selection means for listing the several pieces of information being managed in the document management system and selecting a user-desired piece of information among the listed several pieces of information based on selection operation of the user;

first acquisition means for acquiring setting contents being set for the information selected by the selection means;

determination means for determining whether or not each processing function of the several devices being displayed by the display means can process the selected information according to the setting contents acquired by the first acquisition means; and change means for changing a display form of the displayed icon based on a determination result by the determination means so that it is possible to distinguish between the processing function of the device which can process the information according to the setting contents and the processing function of the device which cannot do so.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIGS. 4A and 4B show examples of a window screen in which registered devices are displayed as icons;

DETAILED DESCRIPTION OF THE PREFERRED EMBODIMENTS

First Embodiment

A document management system according to an embodiment of the present invention will be described in detail below with reference to drawings.

Figure 1:
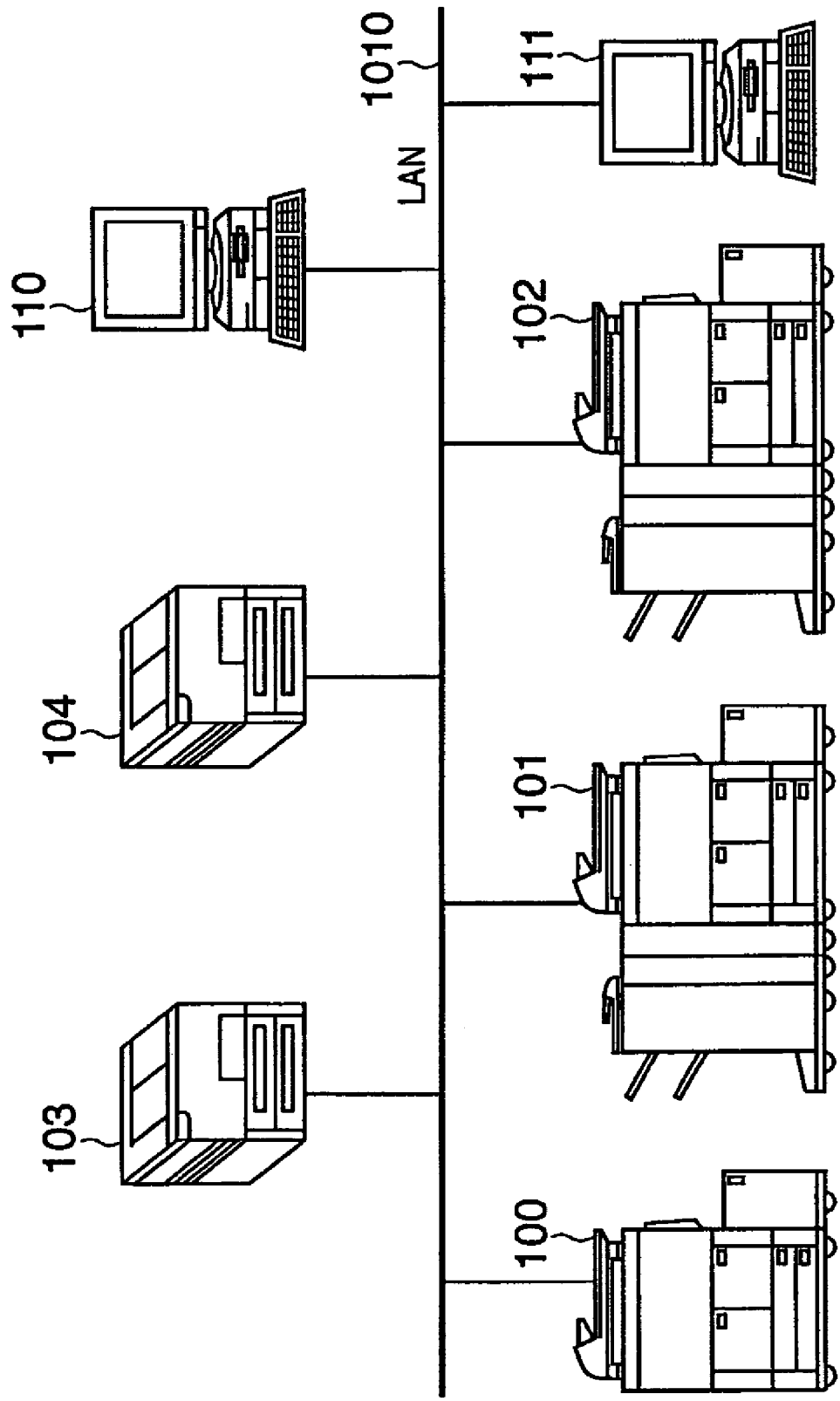
FIG. 1 is a block diagram for illustrating an example of configuration of an entire network environment provided with a document management system according to an embodiment of the present invention.

FIG. 1 is a block diagram for illustrating an example of configuration of an entire network environment provided with a document management system according to an embodiment of the present invention. In the network environment including the document management system, shown in FIG. 1, reference numerals 100, 101 and 102 denote image input/output apparatuses (digital multi-function machines). In this embodiment, it is assumed that the respective image input/output apparatuses have different functions. For example, whether or not a color processing function is provided, whether or not finishing configuration is provided, and the like depend on each image input/output apparatus.

In FIG. 1, reference numerals 103 and 104 denote image output apparatuses (printers), and similarly, the image output apparatuses have different functions. These image input/output apparatuses 100 to 102 and the image output apparatuses 103 and 104 are connected to one another via a network such as a LAN 1010. To the LAN 1010, there are connected personal computers (PC) 110 and 111, and, in this embodiment, the PC 110 or the PC 111 is used to operate the document management system to be described below.

Though a document management system is constructed on one PC in this embodiment, it is also possible to construct a client/server type document management system including a document server and a client which utilizes the document server.

Figure 2:
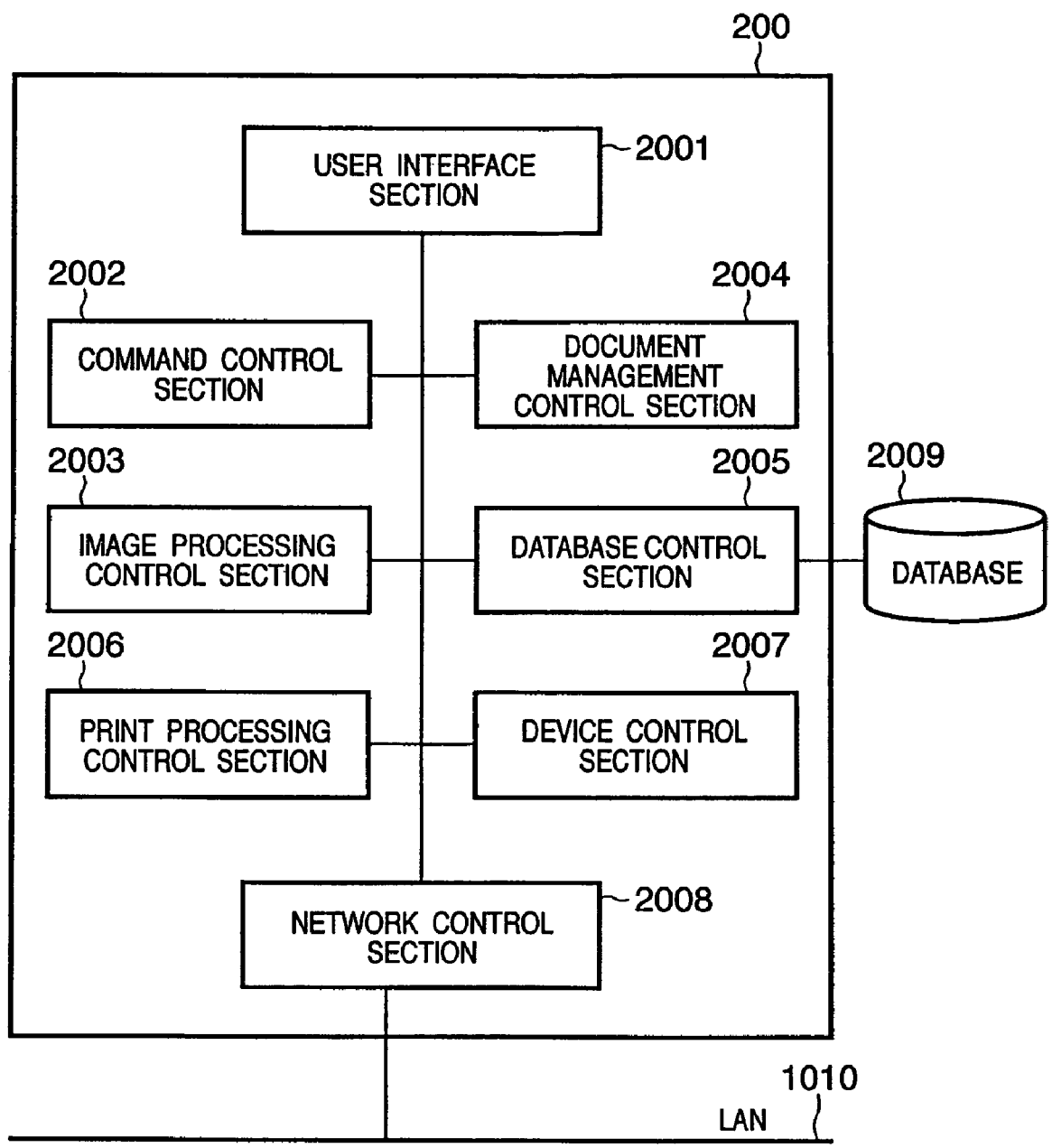
FIG. 2 is a block diagram for illustration configuration of the document management system operating on a PC 110.

FIG. 2 is a block diagram for illustration configuration of the document management system operating on the PC 110. In the document management system shown in FIG. 2, the same reference numerals are given to components similar to those in the network environment shown in FIG. 1.

As shown in FIG. 2, in a document management system 200, reference numeral 2001 denotes a user interface section. A user (an operator) performs operations, such as connection to the image input/output apparatuses 100 to 102, registration of a document with a database 2009, and printing of a registered document, via the user interface section 2001. Information operated from the user interface section 2001 is analyzed by a command control section 2002 and appropriately processed. The command control section 2002 also creates a command for performing communication with a server when necessary.

In FIG. 2, reference numeral 2003 denotes an image processing control section, which performs image format conversion processing for converting image formats such as TIFF and bitmap, compression-expansion processing, and the like for a document or image inputted to or outputted from the document management system according to purposes. Reference numeral 2004 denotes a document management control section, which controls all processings related to document management. Reference numeral 2005 denotes a database control section, which controls processings for creating and storing data to be stored in each of a volume database for storing document and image data themselves existing in the database 2009, an attribute management database for storing names and creation dates of documents, comments or print format information about print job documents, and a full text retrieval database for storing data obtained by extracting text data from registered documents and making it index information.

Furthermore, reference numeral 2006 denotes a print processing control section, which performs control for performing print processing in accordance with the format of a document to be printed. Reference numeral 2007 denotes a device control section which inputs/outputs information among the image input/output apparatuses 100 to 102 and the image output apparatuses 103 and 104. Reference numeral 2008 denotes a network control section, which connects to the LAN 1010 to inputs/outputs information from/to other apparatuses.

Next, description will be sequentially made on processing for registering a device connected on a network with the document management system and processing for changing display of an index, such as an icon, of a registered device when a print job document is selected.

<Device Registration Processing>

Figure 3:
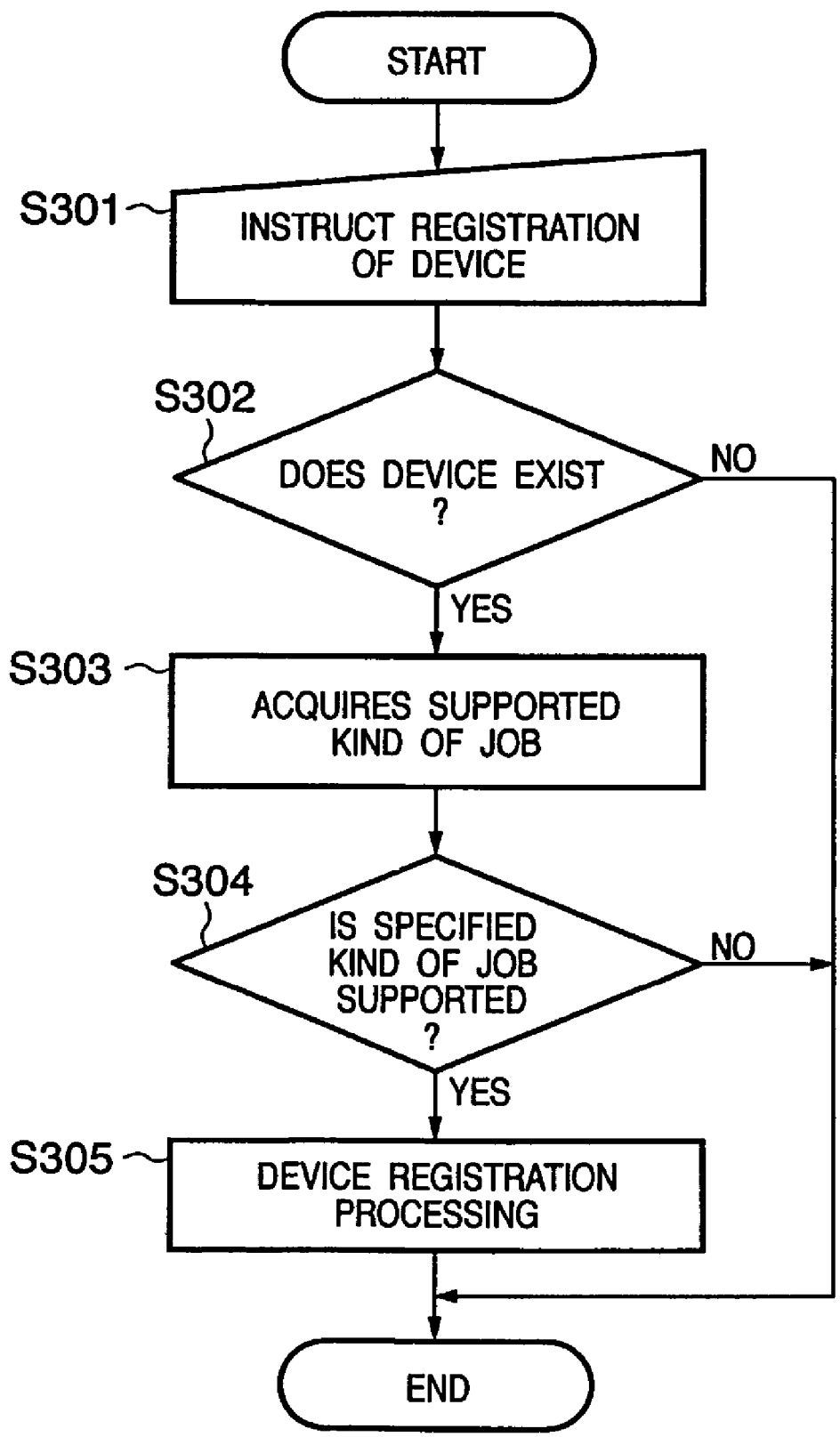
FIG. 3 is a flowchart for illustrating device registration processing in the document management system in this embodiment.

FIG. 3 is a flowchart for illustrating device registration processing in the document management system in this embodiment. This processing is performed under the control of the CPU based on a program stored in the ROM or the like of the PC 110.

First, in order to enable a device such as an image input/output apparatus connected on the network (the LAN 1010) to be used on the document management system 200, a user gives an instruction for registering the device such as an image input/output apparatus with the use of the user interface section 2001 (step S301). In response to this instruction, the status changes to a mode for inputting information about whether the image input/output apparatus to be registered exists on the network and specifying the kind of job to be handled by the apparatus to be registered.

For example, unique information, such as an IP address which is specific information set for the image input/output apparatus in advance, can be used as the information for detecting a desired image input/output apparatus from among various devices existing on the network. As the kind of job, for example, a scan job for registering a document or image with a database, a print job for printing a document of a database with the use of a printer driver and a print job for printing a document in which print settings are already held are included. At step S301, the operator inputs the information and instructs execution of registration.

Next, in response to the device registration instruction given at step S301, the device control section 2007 inquires of a device connected to the network about whether it is an image input/output apparatus, based on the specified information via the network control section 2008 (step S302). Receiving the inquiry request from the document management system, the image input/output apparatus sends notification to the effect that an image input/output apparatus exists via the network.

That is, if an image input/output apparatus exists (Yes), then the device control section 2007 receives the information sent from the image input/output apparatus and performs processing of step S303 to be described later. On the other hand, if there is not a reply from an image input/output apparatus in a predetermined period of time, that is, if an image input/output apparatus does not exist (No), then the device registration processing is terminated.

At step S303, the device control section 2007 requests to acquire information about the kinds of job supported by the image input/output apparatus. Having received the acquisition request, the image input/output apparatus returns the kinds of job it supports, and thereby, the document management system acquires the kinds of job supported by the image input/output apparatus.

Then, the device control section 2007 determines whether or not the information about the supported kinds of job includes the kinds of job specified when device registration was instructed (step S304). As a result, if the specified kinds of job are included (Yes), then the procedure proceeds to step S305. On the other hand, if the specified kinds of job are not included (No), then the device registration processing is terminated.

If it is determined that the image input/output apparatus supports the specified kinds of job and is a registerable input/output apparatus, then, at step S305, the database control section 2005 displays the icon of the image input/output apparatus in the window, in which icons of registerable devices are displayed, as a new icon. The icon to be displayed then differs depending on the kind of job specified when device registration was instructed. In this embodiment, an icon which is a simplified graphic is used as an index corresponding to the kind of apparatus. In addition, the index may be expressed with a character or a symbol.

FIGS. 4A and 4B show examples of a window screen in which registered devices are displayed as icons. In FIG. 4A, a window 400 is displayed in which icons before registration of the image input/output apparatus 102 are shown, and it is shown that seven devices are already registered before the registration. In FIG. 4A, icons 4001, 4002 and 4003 indicate that the document management systems 100, 101 and 102 are registered as devices supporting a scan job. Icons 4004 and 4005 indicate that the image output apparatuses 103 and 104 are registered as devices supporting a print job from a printer driver.

Icons 4006 and 4007 indicate that the image input/output apparatuses 100 and 101 are registered as devices supporting a print job for printing a document print settings already held therein. Meanwhile, FIG. 4B shows the window 400 displayed after the image input/output apparatus 102 has been registered as a new icon 4008. Thereby, it is possible to input a document print job into the image input/output apparatus 102 on the document management system according to this embodiment.

<Device Icon Display Changing Processing>

Figure 5:
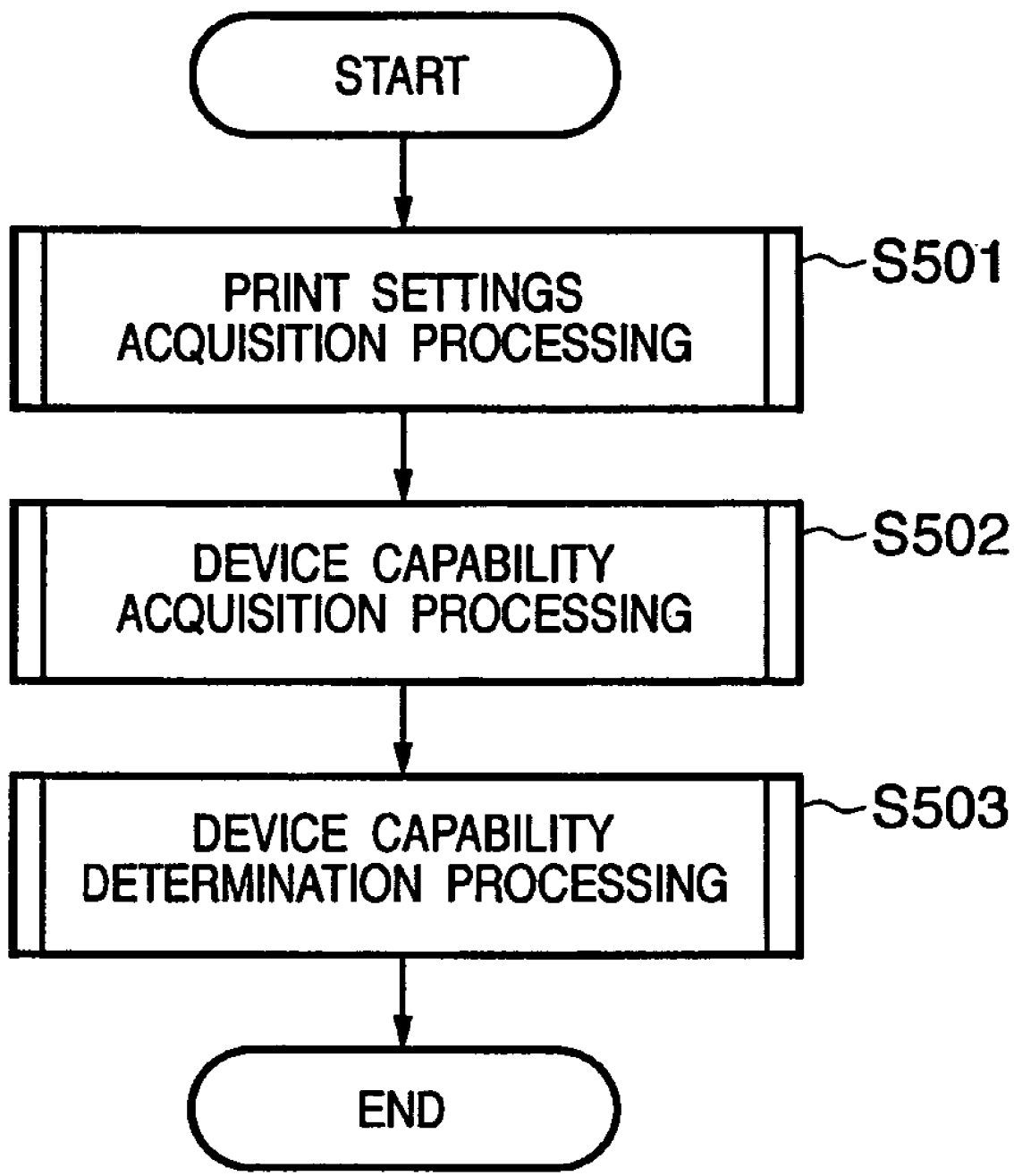
FIG. 5 is a flowchart for illustrating the entire flow of device icon display changing processing in the document management system in this embodiment.

FIG. 5 is a flowchart for illustrating the entire flow of device icon display changing processing in the document management system in this embodiment. This processing is performed under the control of the CPU based on a program stored in the ROM or the like of the PC 110.

First, processing for acquiring print settings for a selected document is performed when the document is selected by the user from a plurality of documents registered with the database of the document management system (step S501). Then, processing for acquiring device capability is performed for registered devices (step S502). Then, device capability determination processing is performed for determining whether or not to change display of icons indicating the devices, based on the acquired document print settings and the acquired device capability (step S503). In addition, the processing of step S502 and S503 is not performed if the selected document does not have print settings. Each of the processings will be described in detail below.

Figure 6:
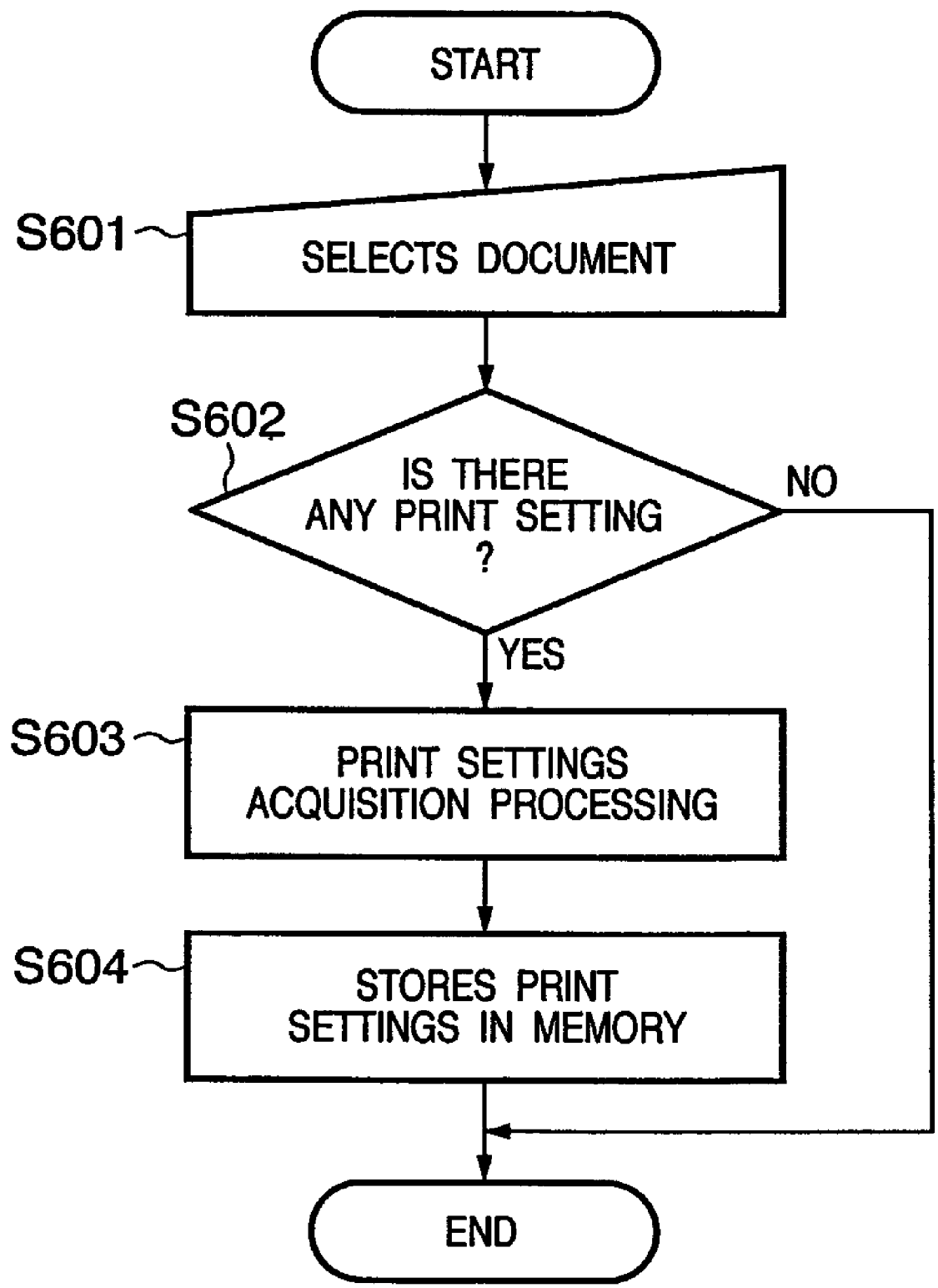
FIG. 6 is a flowchart for illustrating details of print settings acquisition processing (step S501)

FIG. 6 is a flowchart for illustrating details of print settings acquisition processing (step S501). First, based on selecting operations by the operator, a document to be printed is selected from among documents registered with the database 2009 of the document management system (step S601). For example, first, document information about the documents registered with the database 2009 is displayed as a list in the user interface section 2001 of the document management system. Not only the document information list but also thumbnail images of the documents may be displayed. The document information includes, for example, document names, document sizes and the numbers of pages of the documents, and one document is displayed on one line as a list item.

The operator selects a desired document by specifying it from the list or among the thumbnail images by means of a pointing device such as a mouse. Display form of the selected line in the list or the selected thumbnail image changes into highlighted display or reverse display. Thereby, the operator can know that the document has been selected.

In the document management system according to this embodiment, it is possible to register documents in multiple document formats with a database and manage them. For example, it is possible to register document data read by an external input apparatus, such as a scanner, as an image document and to register document data created by any application operating on a computer as a code document. Furthermore, it is also possible to acquire a document accumulated by a multi-function digital copying machine via a network and register it with a database.

A digital copying machine accumulates scanned data read from a reading apparatus (a scanner) as a scanned document. Also, the digital copying machine accumulates print data created with the use of a printer driver and outputted (stored) in a host computer as a print job document (document having print settings). The accumulated documents are similarly registered with the database 2009, wherein a scanned document is registered as an image document and a print job document is as a print job document, so that the documents in multiple document formats are managed in an integrated manner.

After a document is selected at step S601, it is determined whether information about print settings is held in the selected document (step S602). As a result, if a document with print settings held therein, that is, a print job document has been selected (Yes), then the procedure proceeds to step S603. On the other hand, if a document without print settings, that is, a document in which print settings are not held has been selected (No), then the processing is terminated.

If a print job document has been selected, print settings information about the selected document is acquired from the database 2009 at step S603. In the database 2009, print settings information, for example, a print method such as both-side printing and binding and a discharge method such as punching and stapling are registered as binary data or the like.

Then, the document management system determines whether each print setting information is set based on the print settings information acquired from the database 2009, and stores set information in a memory as a list (step S604).

Figure 7:
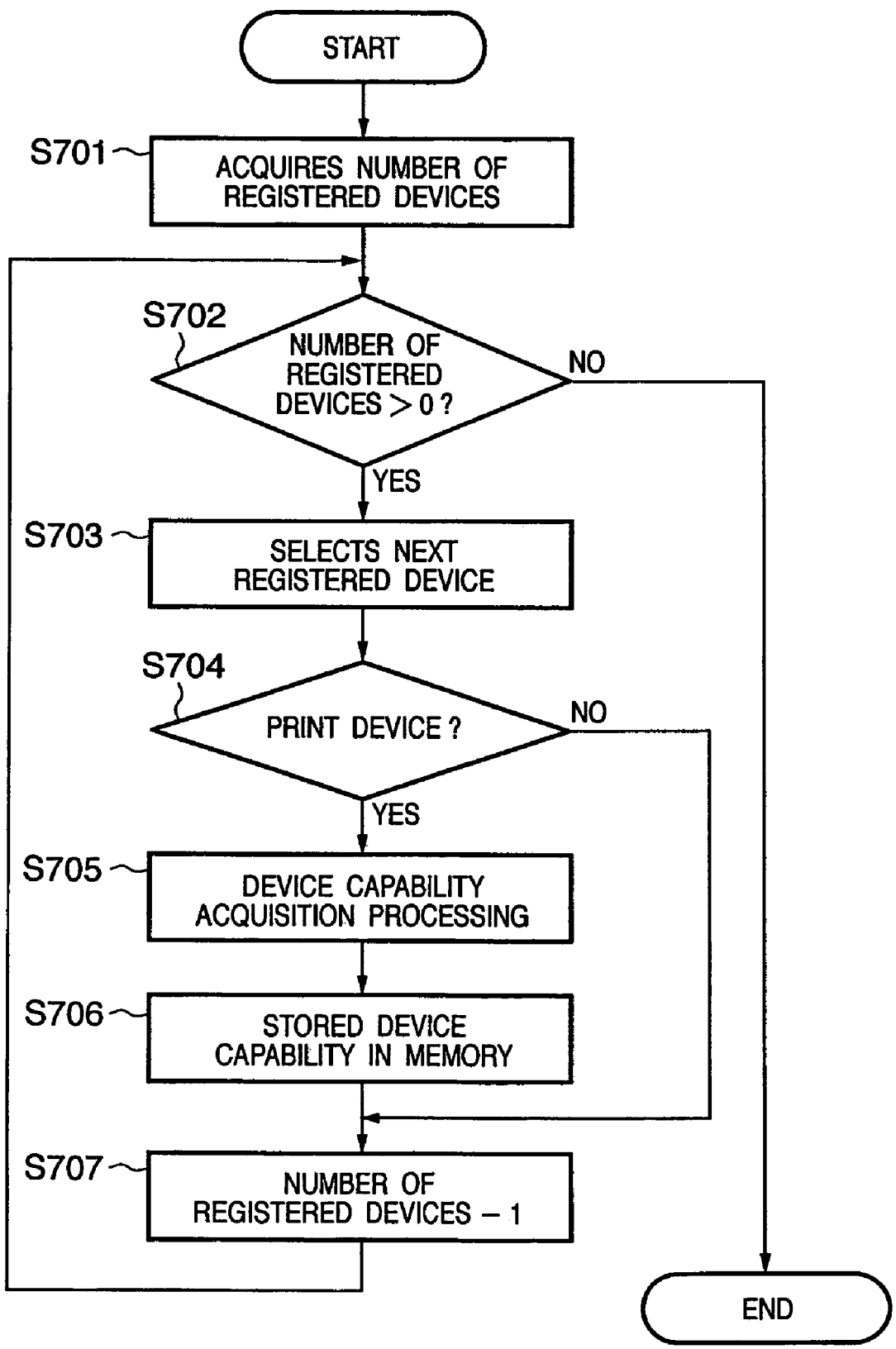
FIG. 7 is a flowchart for illustrating details of device capability acquisition processing (step S502)

FIG. 7 is a flowchart for illustrating details of device capability acquisition processing (step S502).

First, the document management system acquires the number of devices already registered (step S701) and substitute it as a value of a registered device number counter. The number of registered devices is counted up when a new device is registered, and held in a memory within the system. Then, it is determined whether or not the number of registered devices is larger then 0, that is, whether or not there exists any device which is not subjected to the processing of steps S703 to S707 (step S702). As a result, if the number counter of registered devices is larger than 0 (Yes), then the procedure proceeds to step S703. If the number counter of registered devices is 0 or below, that is, there is no target device (No), then the processing is terminated.

The unprocessed registered devices are selected in sequence at step S703. Then, the kind of a selected, registered device is checked to determine whether it is a print device or not (step S704). In addition, the kinds of device include: a device supporting a scan job, a device supporting a print job for printing a document in a database with the use of a printer driver, a device supporting a print job for printing a document with print settings already held therein, and the like.

Here, in the case of a device supporting a print job for printing a document with print settings already held therein (Yes), the processing of step S705 is performed. In the case of other devices (No), then the processing of step S707 is performed.

If the registered device is a device supporting a print Job for printing a document with print settings already held therein, the capability of the device is acquired at step S705. Specifically, the device control section 2007 inquires, about whether the function of each print setting is provided or not, via the network control section 2008. Receiving the inquiry request, the image input/output apparatus (the device) sends information about whether the function is provided or not to the document management system via the network.

Based on the information about whether functions are provided or not acquired from the device, the document management system stores supported functions in a memory as a list for the device (step S706). Then, in order to select the next registered device and perform the above-described processing, the procedure decrements the number counter of registered devices (−1) and returns to the processing of step S702.

Figure 8:
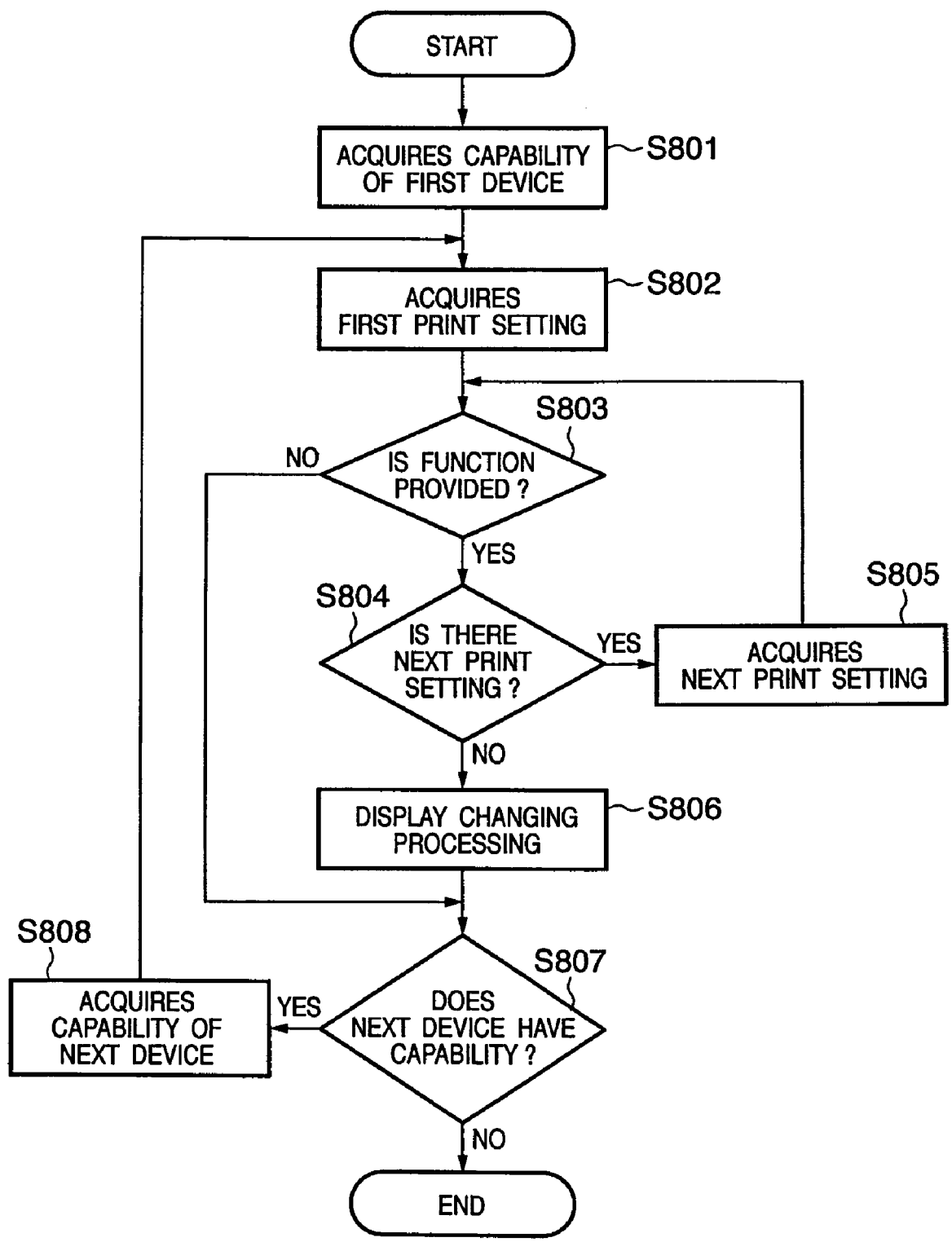
FIG. 8 is a flowchart showing device capability determination processing (step S503)

FIG. 8 is a flowchart showing device capability determination processing (step S503).

The document management system acquires information about the capability of the first device which has been acquired by the device capability acquisition processing of step S502 (step S801). Then, the first print setting information acquired by the print settings acquisition processing of step S501 is acquired (step S802).

Then, it is checked whether or not the print setting information acquired at step S802 is included in the device capability information acquired at step S801, that is, whether or not the device has the function corresponding to the printing setting (step S803). As a result, if the device has the function corresponding to the print setting (Yes), then the procedure proceeds to step S804. Otherwise (No), the processing of step S807 is performed.

At step S804, it is determined whether or not the next print setting exists in the list stored in the memory. As a result, if the next print setting exists (Yes), then the procedure proceeds to step S805. If the next print setting does not exist (No), then the procedure proceeds to step S806.

At step S805, the next print setting is acquired, and the procedure returns to the processing of step S803. If it is determined that the device has all the functions corresponding to all the print settings held in the document acquired at S501, the display form of the icon indicating the device is changed at step S806.

At step S807, it is determined whether or not the next device exists in the list stored in the memory. As a result, if the next device exists (Yes), then the capability existence/nonexistence information of the next device is acquired (step S808), and the procedure returns to the processing of step S802. On the other hand, if the next device does not exist (No), the processing is terminated.

In this embodiment, a processing for changing the icon display is performed so that the user can determine the print settings set in the print job document when the user selects a print job document and identify a device having a function corresponding to the print settings, through the above-described processing. The user can identify a device which can print with the print settings held in the print job document at the time when the user selects the print job document before a print instruction is performed. Therefore, only by performing a print instruction of the print job document for the identified and displayed device, print can be done with the print settings being set in the print job document, increasing convenience for the user. In addition, the print instruction of the print job document is performed by an operation of dragging and dropping the print job document selected at step S601 among the listed documents to a desired device among the identified and displayed devices. Also, by providing an alarm display that print cannot be done with the print settings if a print instruction is performed on a device other than identified and displayed, the convenience is further increased.

Figure 9:
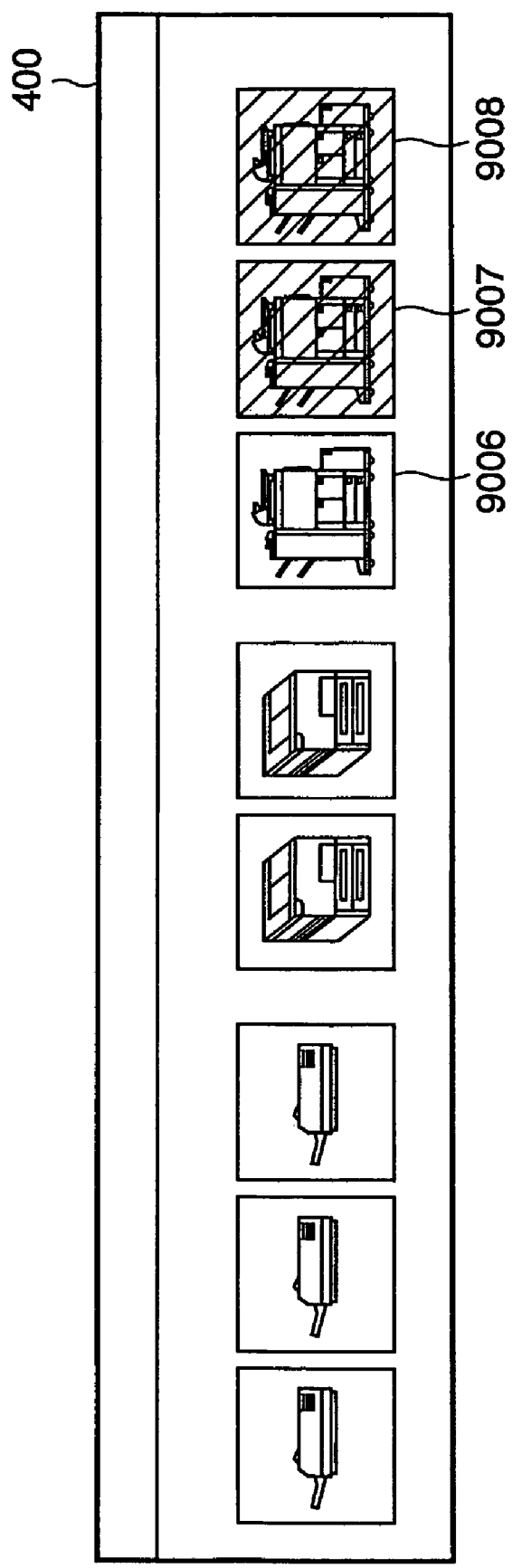
FIG. 9 shows an example of a window in which device icons are displayed when a print job document is selected in the document management system according to this embodiment.

FIG. 9 shows an example of a window in which device icons are displayed when a print job document is selected in the document management system according to this embodiment. For example, device icons 9006, 9007 and 9008 indicates devices supporting a print job for printing a document with print settings already held therein and the device indicated by the device icon 9006 is assumed to be a device without a stapling function, and the devices indicated by the device icons 9007 and 9008 are assumed to be devices having a both-side printing function and a stapling function. In this case, if the both-side printing and stapling are set for a selected print job document, then display form of the device icons 9007 and 9008 changes. In FIG. 9, the display form of an icons changes into reverse display. However, it is also possible to differently change the display form, such as changing colors or flickering the icons. Alternatively, it is also possible to change the display form of indexes, such as icons, corresponding to apparatuses for which processing settings have not been made to show that the apparatuses corresponding to the indexes are disabled.

Figure 10:
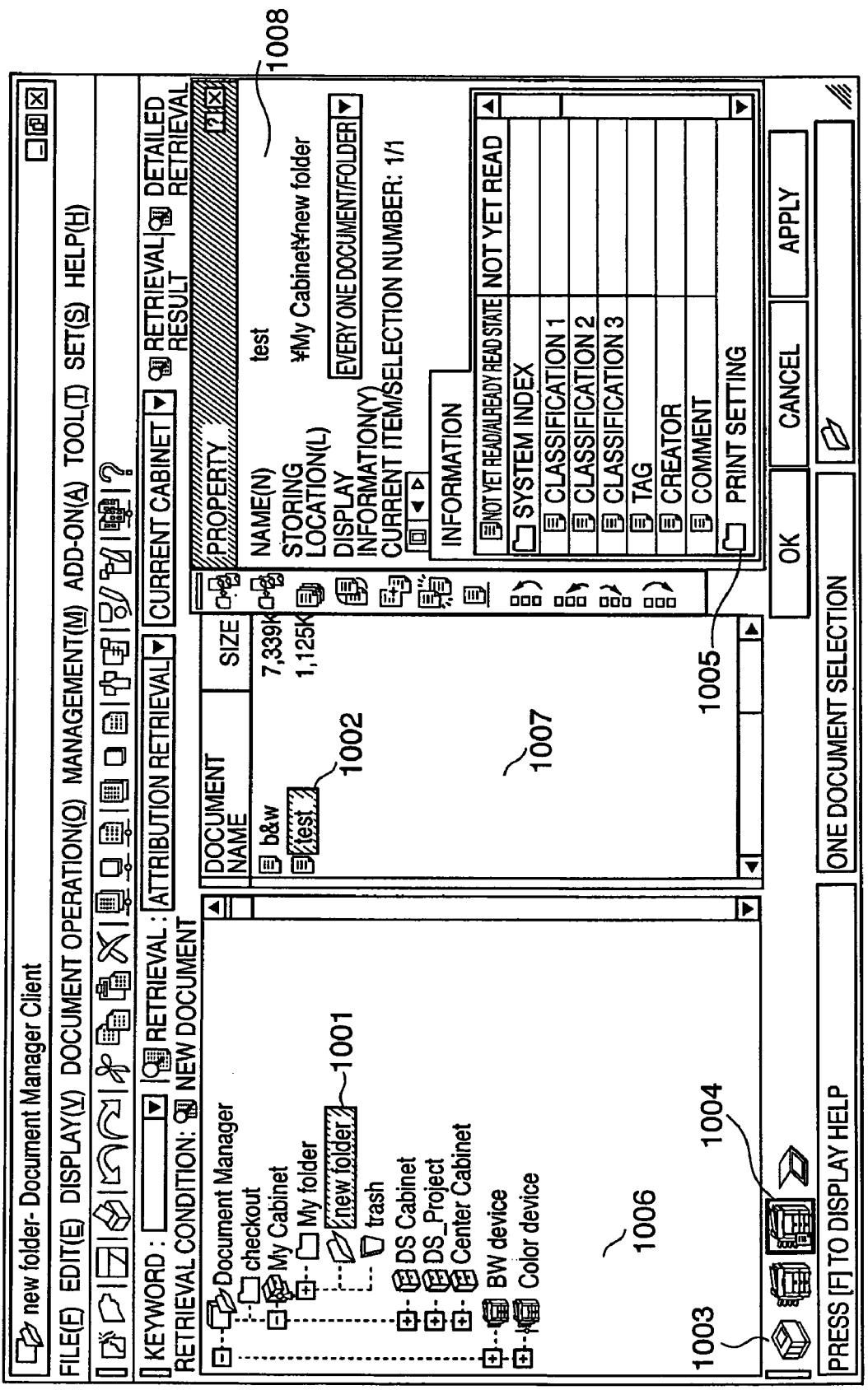
FIG. 10 is a screen example displayed by a document management program when a print job document in a database is selected.
Figure 11:
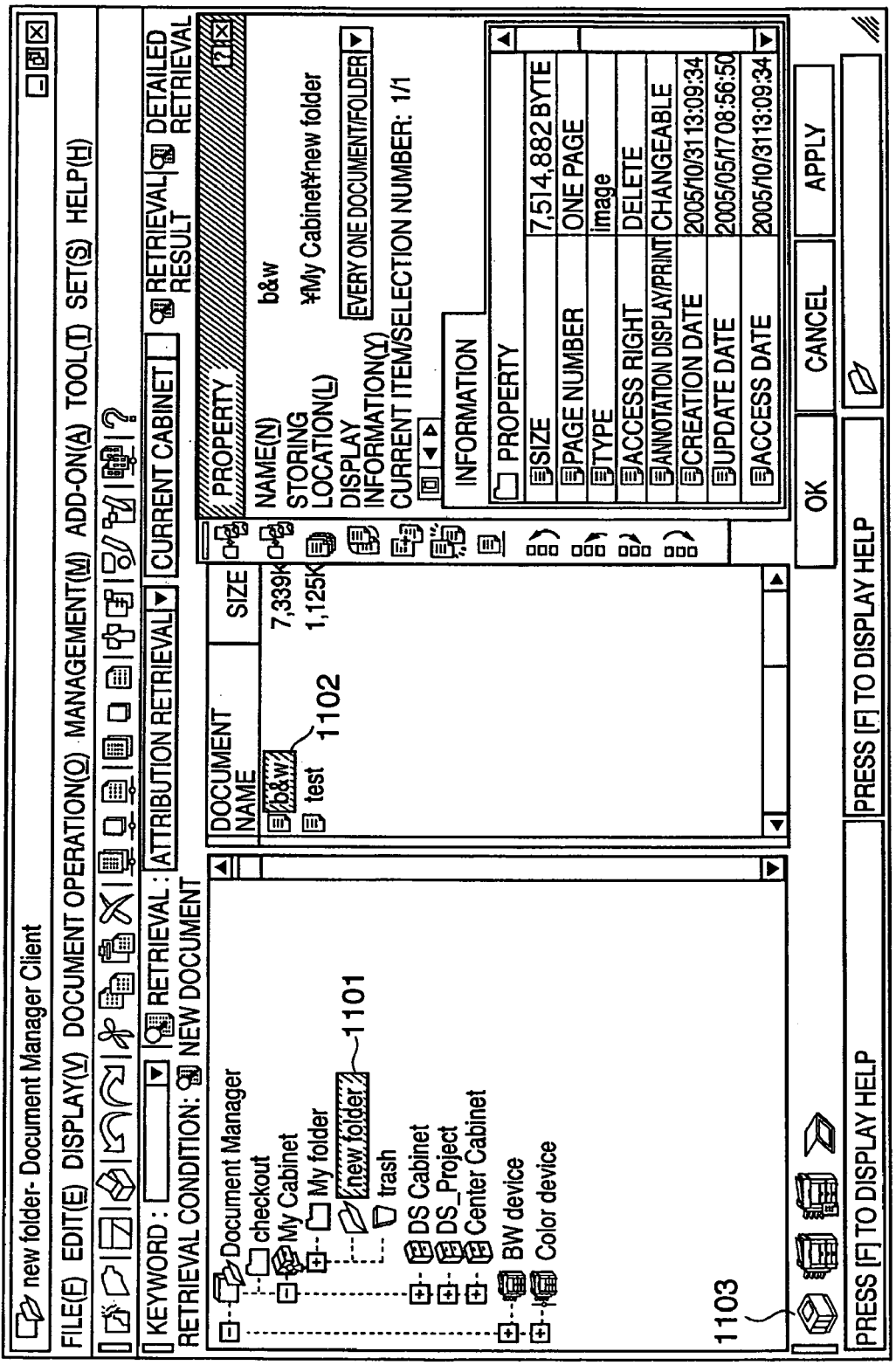
FIG. 11 is a screen example displayed by a document management program when a normal document which does not have print settings is selected in a database.

Although a window of a device icon is displayed in a window different from a document management window in FIGS. 4 and 9, this is not limiting. FIGS. 10 and 11 are examples of the case where display regions (1003, 1103) of the device icon are included in a window of a document management application.

FIG. 10 is an example of a display screen when a print job document is selected in a document management client. In the left column 1006 of the display screen of FIG. 10, databases (cabinets) and a folder structure included in each database are displayed. In the central column 1007 of the display screen, documents included in a folder (or database) selected by a user at the left column 1006 are displayed. In the right column 1007 of the display screen, a property of a document selected by a user at the central column 1007 is displayed. Also, a device icon display region 1003 has several device icons displayed therein, as shown in FIGS. 4 and 9. In FIG. 10, a print job document "test" 1002 included in a "new folder" 1001 is selected. Since the print job document "test" 1002 is a document which has print settings, the print settings 1005 are displayed in the property. Further, a device 1004, which can process the selected print job document "test" 1002 is identifiably displayed. In FIG. 10, a device which can process a job document is displayed as surrounded by a colored square.

FIG. 11 shows a display screen when a normal document "b&w" 1002 included in a "new folder" 1101 is selected. Since this selected document does not have a print setting, a display of a device icon display region 1103 is not changed.

Furthermore, in this embodiment, if a print job document for which multiple print settings are made is selected, display of icons indicating devices having all the functions corresponding to the settings are changed. However, it is also possible to change display of icons indicating devices having a part of functions corresponding to the print settings. For example, only a device having a particular processing function or a device of a particular kind is specified at registration so that only apparatuses having the specified processing function may be registered. Also, although the icons in the above-described embodiments use simplified figures of devices, the icons are not limitative, and photographs, symbols and characters may be used as icons and further may be in combination of those as Icons.

Also, although an example when the user selects a print job document (a document having print settings held therein) is shown in the above-described embodiments, the print job document is not limitative. For example, if a normal document which does not have print settings held therein is selected, the icon display may be changed so that any device capable of printing via a printer driver can be identified. Also, a scan job file having a scan setting (such as reading resolution) held therein is selected, the icon display may be changed so that any device supporting a scan job with the scan setting can be identified. In that case, when a user-desired device is selected among the identified and displayed devices, a scan with the scan setting is performed in the device and the document obtained by the scan is stored in a database in the document management system.

Also, the document management system of this embodiment may be composed of a document management server, a document management client apparatus and a database server. In that case, a user interface portion of the document management client displays a display screen as shown in FIGS. 10 and 11, performs command analysis in response to an instruction from the user, and sends the command instruction to the document management server. The document management server acquires information of a document from the database server according to the instruction from the document management server and transmits it to the document management client. In FIG. 6, the document management client acquires print setting information of a selected print job document via the document management server. In FIG. 7, the document management client may acquire the capacity of a device directly from the device or via the document management server.

As described above, according to the present invention, in a document management system capable of displaying multiple input/output devices (such as a scanner and a printer) which are connectable on a network as icons or the like, in one window on the document management system, and performing input/output processing of documents registered with a database of the document management system by operating the icons, when a document to be printed is selected, the form of the icon of a device capable of printing the document in accordance with print settings held by the document is changed and displayed. And thereby, it is possible to visually determine a device suitable for printing the selected document and reduce troublesome works in print processing.

Second Embodiment

A device of Embodiment 2 (for example, digital multi-function machines 100, 101, 102) is intended to have a storage (for example, hard disk). Further, at least one storage region (referred to as box) which can store print job documents, image documents obtained by scanning and the like may be included in this storage. However, a job document which can be stored in a box in this device is a document which can be processed by the device which has the job document stored therein.

Figure 12:
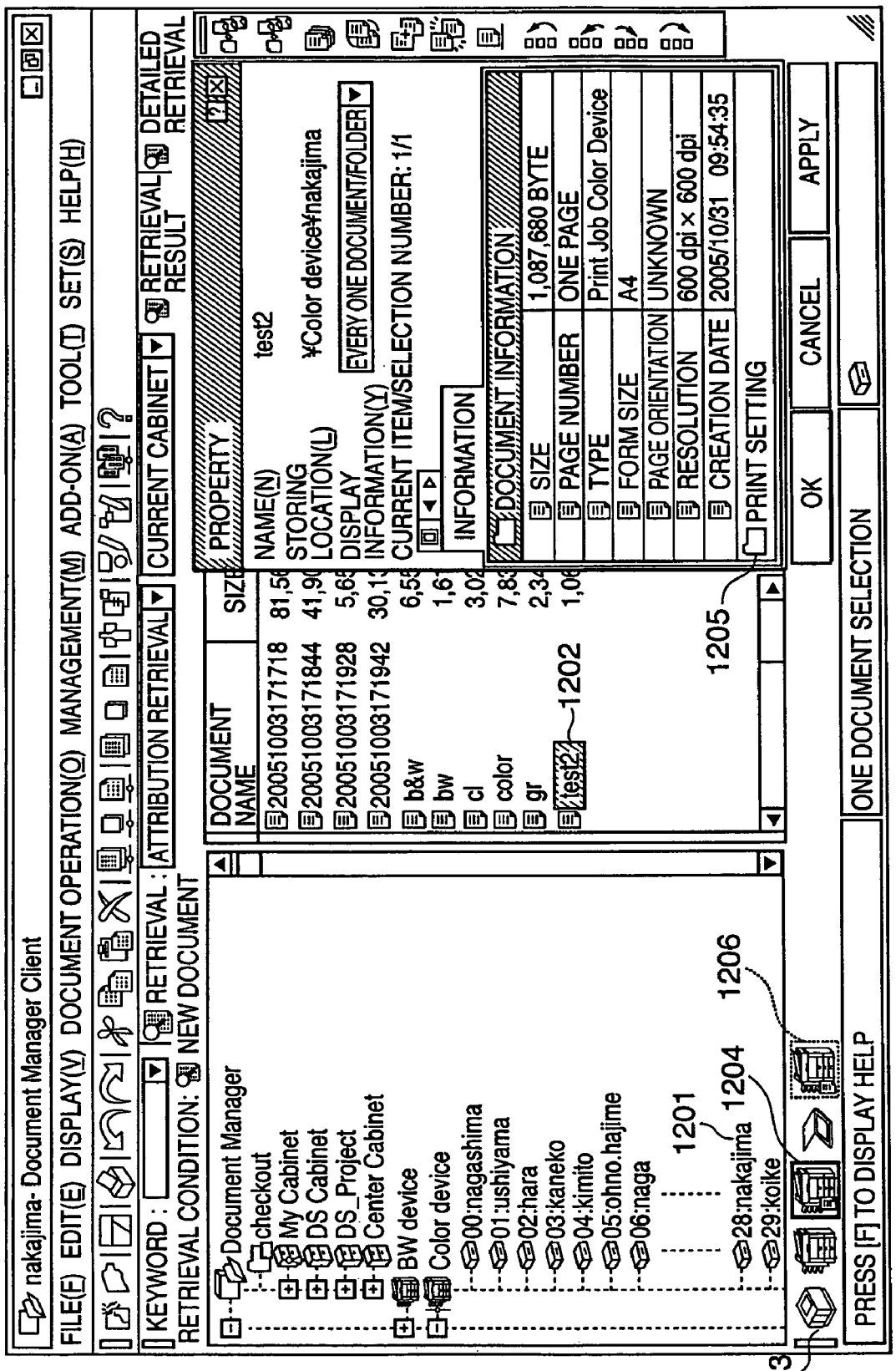
FIG. 12 is a screen example displayed by a document management program when a print job document stored in a box in a device is selected.

FIG. 12 is a display screen when boxes of a device is displayed in addition to cabinet databases of a document management system. The device has several boxes. When a box 1201 "28:nakajima" in "Color device" is selected, documents included in the box 1201 are displayed in the central column. Further, when a print job document 1202 is selected among a document list of the box 1201 displayed in the central column, a property of the print job document 1202 is displayed in the right column. A print setting 1205 which is set to the print job document 1202 is displayed in the property. Further, a device icon 1204 showing the device in which the print job document 1202 is stored is identifiably displayed (for example, displayed as surrounded by a green square).

Also, other devices which can be print processed with the print setting to the print job document 1202 are detected and the detected other device icons 1206 are also identifiably displayed (for example, displayed as surrounded by a yellow square). In this way, the identification display of the icon 1204 of the device in which the print job document is stored and the identification display of the other device icon 1206 are intended to be displayed in different display forms.

Figure 13:
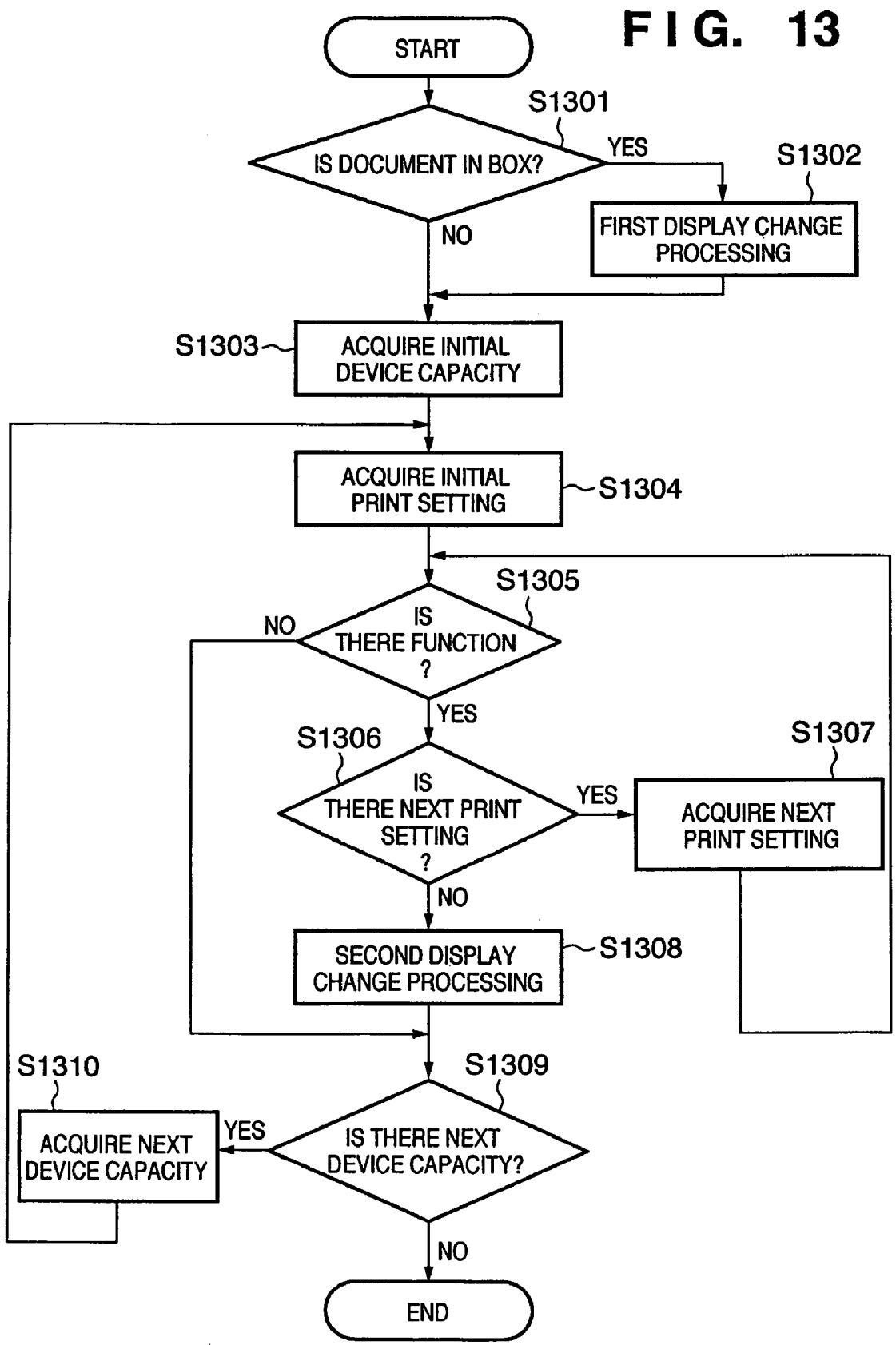
FIG. 13 is a flowchart showing a device capacity determination processing in Example 2.

FIG. 13 is a diagram showing details of device capacity determination processing (S503) in Embodiment 2. In step S1301, determination is made whether a print job document selected by a user is a print job document stored in a box of a device.

If it is determined that the selected document is the print job document stored in the box in step S1301, processing is performed to change the icon 1204 of the device having the box of the print Job documents to a first display form in step S1302. Thereafter, it proceeds to processing in step S1303, wherein the processes from step S1303 to S1310 are executed for other devices other than the device which has been display changed in S1302.

On the other hand, if it is determined in step S1301 that the selected document is not the print job document stored in the box (i.e. the selected document is the print job document stored in a cabinet), it proceeds to processing in step S1303, wherein the processes from step S1303 to S1310 are executed for all devices.

Processing from step S1303 to step S1310 is similar to the processing from step S801 to step S808. However, display change processing in step S1308 is displayed in a second display form different from the display change processing in step S1302.

In this way, by distinctively displaying the first and second display forms, the device in which the print job document is stored and other devices which can process the print job document can be distinctively identified.

Third Embodiment

Figure 14:
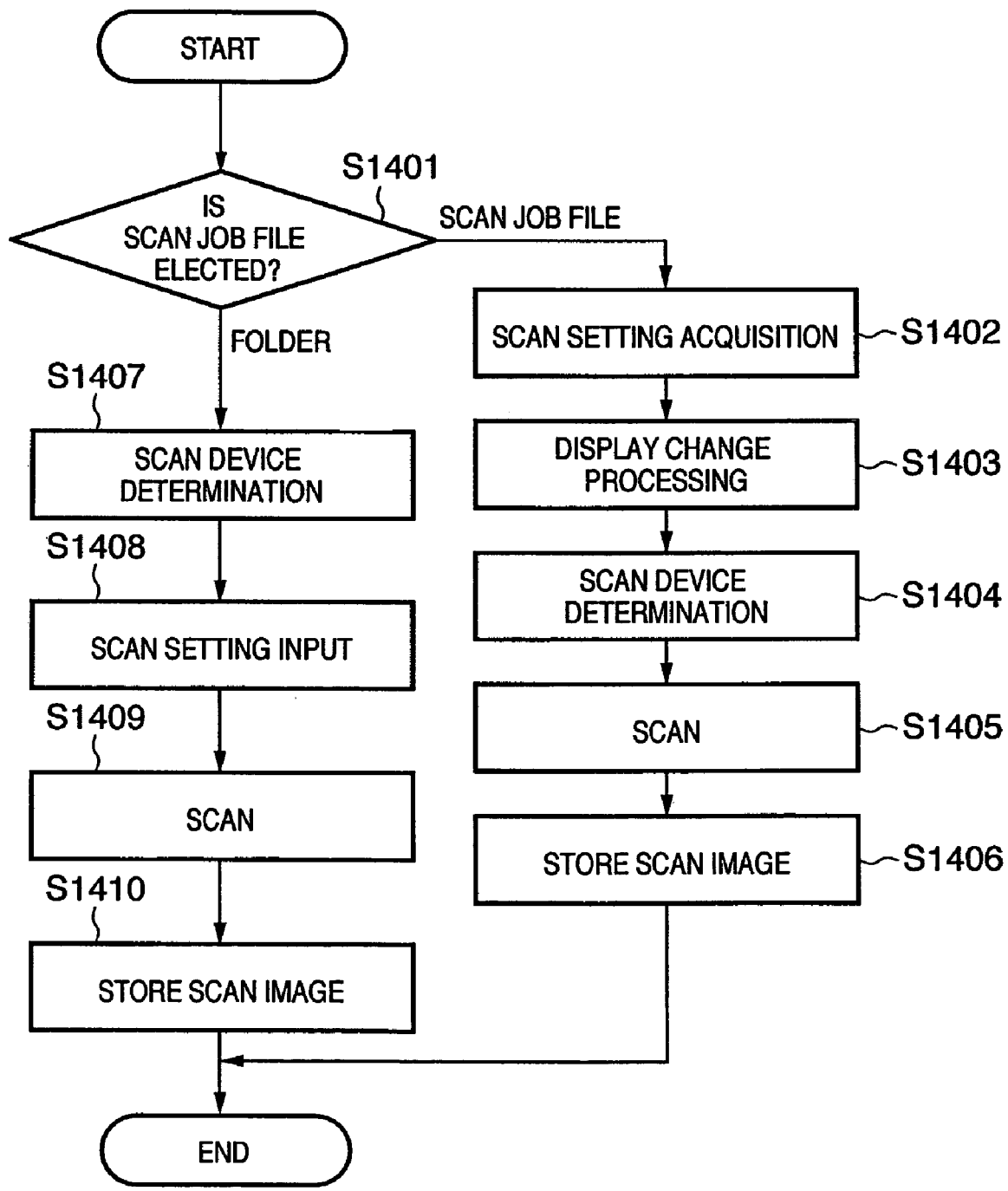
FIG. 14 is a flowchart relating to scan processing.

FIG. 14 is a flowchart of scan processing. In a display screen such as FIG. 10, it is intended that a scan job file which is subjected to a scan setting (resolution, black and white scan, color scan, format, etc) can be stored in a folder.

In step S1401, it is determined whether the scan job file is selected or the folder is selected.

If the scan job file is selected, the scan setting which is set to the scan Job file is obtained in step S1402. In step S1403, a device which can be scanned with the obtained scan setting is determined and the display of the device icon of the device which is determined as can be scanned is changed. When the user selects one of the device icons which are display changed, the scan device of the selected device icon in step S1404 is determined. In step S1405, a scan instruction is transmitted to the determined scan device. In step S1406, the image document obtained by scanning is stored in the same folder as the folder in which the scan Job file is present.

On the other hand, in step S1401, if the folder is selected, the scan device icon selected by the user is determined. In step S1408, the user is force to input a desired scan setting among the scan settings which can be set in the scan device. In step S1409, a scan instruction is transmitted to the scan device so as to scan based on the input scan instruction. In step S1410, the image document obtained by scanning is stored in the folder selected in S1401.

As described above, since display change processing of a device icon is also performed to a scan Job file, the user can easily determine a device which can be scanned with a predetermined scan setting.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, it is possible to display indexes indicating input/output devices connected on a network in a manner that an operator can clearly distinguish between devices which are capable of correctly performing processing in accordance with the settings made for an inputted job and devices which are not capable thereof.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-350307 filed on Dec. 2, 2004 and 2005-328086 filed on Nov. 11, 2005, which are hereby incorporated by reference herein.

What is claimed is:

1. A document management apparatus which communicates with a plurality of devices and processes a user-desired document selected from a plurality of documents managed by the document management apparatus, comprising:

a memory constructed to store a computer-executable program; and a Computer Processing Unit (CPU) constructed to execute the computer-executable program stored in the memory, wherein the CPU executes the computer-executable program stored in the memory so as to control the document management apparatus to communicate with the plurality of devices, and process the user desired document selected from the plurality of documents managed by the document management apparatus, the computer-executable program including program codes for which the CPU executes steps that comprise:

storing, in the memory, processing functions of a plurality of devices connected to the document management apparatus;

displaying icons on a screen, wherein each icon corresponds to each of a plurality of devices connected to the document management apparatus;

displaying a list of the plurality of documents managed by the document management apparatus, and accepting a selection of a user-desired document in the displayed list of the plurality of documents based on a selection operation of a user;

acquiring settings which are held in the selected user-desired document;

determining which one of the plurality of devices corresponding to the displayed icons can process the user-desired document based on the acquired settings and the processing functions stored in the memory; and changing a display form of a displayed icon based on a determination result determined in the determination step so that the display form of an icon corresponding to the device which can process the user-desired document is distinct from the display form of an icon corresponding to a device which cannot process the user-desired document.

2. The document management apparatus according to claim 1, wherein the steps executed by the CPU further comprise:

specifying a type of a processing function;

discriminating a device having the type of the specified processing function among the plurality of devices connected to the document management apparatus;

registering the discriminated device;

wherein an icon corresponding to the registered device is displayed.

3. The document management apparatus according to claim 1, further comprising a database that stores the plurality of documents, wherein the list of the plurality of documents stored in the database is displayed and a user selection is accepted for selecting a user-desired document in the displayed list of the plurality of documents based on a selection operation of the user.

4. The document management apparatus according to claim 2, wherein the icons which are displayed are indexes expressed using at least either of simplified graphics, characters, symbols or photographs according to the type of the processing function.

5. The document management apparatus according to claim 1, wherein if the selected user-desired document is a print job document, the print settings held in the print job document are acquired.

6. The document management apparatus according to claim 1, wherein the icon corresponding to the device which can process the user-desired document is displayed by either of reverse display, color change or flashing.

7. The document management apparatus according to claim 1, wherein if a plurality of settings are held in the user-desired document a device which can process all of the plurality of settings is determined.

8. The document management apparatus according to claim 1, wherein if a plurality of settings are held in the user-desired document and, a first device which can process at least one of the plurality of settings is determined, a display form of the icon corresponding to the first device is changed.

9. The document management apparatus according to claim 1, wherein a display form of an icon corresponding to a device which cannot process the user-desired document is changed.

10. The document management apparatus according to claim 1, wherein if the selected user-desired document is a scan job file, scan settings held in the scan job file are acquired.

11. The document management apparatus according to claim 1, wherein if the user-desired document is stored in one of the plurality of devices, a display form of an icon corresponding to the device which stores the user-desired document is changed.

12. A method of controlling a document management apparatus which communicates with a plurality of devices and processes a user-desired document selected from a plurality of documents managed by the document management, comprising:

a storage step for storing processing functions of a plurality of devices connected to the document management apparatus;

an icon display step for displaying icons on a screen, wherein each icon corresponds to each of a plurality of devices connected to the document management apparatus;

a selection step for displaying a list of the plurality of documents managed by the document management apparatus, and for accepting a selection of a user-desired document in the displayed list of the plurality of documents based on a selection operation of a user;

an acquisition step for acquiring settings which are held in the user-desired document selected by said selection step;

a determination step for determining which one of the plurality of devices corresponding to the icons displayed in the icon display step can process the user-desired document based on the settings acquired by said acquisition step and the processing functions stored in the storage step; and a change step for changing a display form of an icon displayed by said icon display step based on a determination result determined by said determination step, so that the display form of an icon corresponding to the device which can process the user-desired document is distinct from the display form of an icon corresponding to a device which cannot process the user-desired document.

13. A computer-readable storage medium, having stored thereon a computer-executable program being executable by a computer so as to control the computer to communicate with a plurality of devices, and to process a user-desired document from a plurality of documents being managed by a document management apparatus, the computer-executable program causing the computer to execute the steps that comprise:

storing processing functions of a plurality of devices connected to the document management apparatus;

displaying icons on a screen, wherein each icon corresponds to each of a plurality of devices connected to the document management apparatus;

displaying a list of the plurality of documents managed in the document management apparatus and accepting a selection of a user-desired document in the displayed list of the plurality of documents based on a selection operation of a user;

acquiring settings which are held in the selected user-desired document;

determining which one of the plurality of devices corresponding to the displayed icons can process the user-desired document based on the acquired settings and the stored processing functions; and changing a display form of a displayed icon based on a determination result determined in the determination step, so that the display form of an icon corresponding to the device which can process the user-desired document is distinct from the display form of an icon corresponding to a device which cannot process the user-desired document.

* * * * *